Patented Mar. 6, 1923.

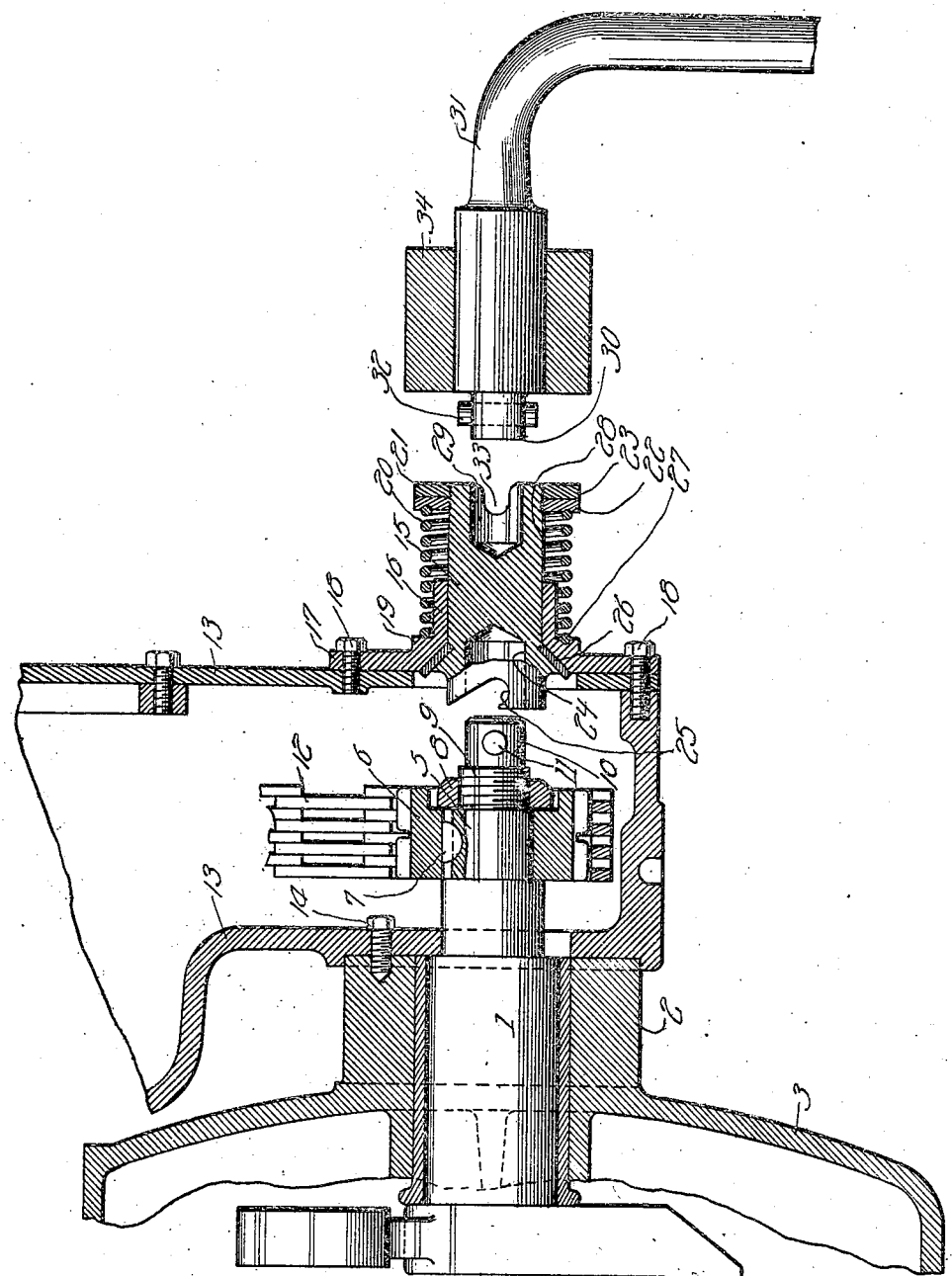

1,447,262

UNITED STATES PATENT OFFICE.

ADOLPH MONSEN, OF LOGANSPORT, INDIANA.

ENGINE.

Application filed September 8, 1919. Serial No. 322,352.

*To all whom it may concern:*

Be it known that I, ADOLPH MONSEN, a citizen of the United States, residing at Logansport, in the county of Cass and State of Indiana, have invented certain new and useful Improvements in Engines, of which the following is a specification.

The invention relates to improvements in engines and has especial reference to the betterment of the crank case of engines of the internal combustion type.

One of the objects of the invention is to provide an automatic seal for the aperture thru which the starting crank of the engine usually extends, operable upon the withdrawal of the starting crank, to prevent oil from leaking thru the aperture.

Another object of the invention is to interpose a spring-impelled starting dog, between the crank shaft of the engine and the starting crank, which automatically disconnects itself from the engine shaft when the starting crank is withdrawn and which, at the same time, automatically closes the aperture in which the dog is axially movable by operation of a suitable valve.

Other, further and more specific objects of the invention will become readily apparent, to persons skilled in the art, from a consideration of the following description when taken in conjunction with the accompanying drawing.

In the drawing 1 represents a power or crank shaft of the engine, having bearings 2 in the crank casing 3. 4 is the crank of the engine shaft. The end of the shaft 5 is reduced in size and supports a gear or sprocket wheel 6, it being secured thereto by a key 7 and a nut 8 threaded over the portion 9 of the shaft. The shaft is further reduced, as at 10, and a transversely positioned pin 11 extends thru the shaft to form a clutch member. 12 may be either a gear, meshing with the gear 6, or it may be a belt for transmitting the power from the power shaft 1 to the usual valve shaft, not shown in the drawing. A casing 13, for containing the train of gearing that connects the power shaft with the valve shaft, is secured to the crank casing 3, by screws 14, or the like. A bearing and support for the starting dog or clutch member 15 consists of a hub portion 16, within which the dog 15 is axially movable, and a flanged portion 17 thru which bolts 18 pass to connect the structure to the casing 13. A shoulder 19 is provided on the hub 16 around which an open helical spring 20 is coiled. The outer end of the dog 15 is provided with a head 21, which may be composed of threaded rings or nuts 22 and 23, and which affords an abutment, or shoulder, for the other end of the spring 20. The inner end of the dog 15 is perforated, as at 24, to receive the reduced end 10 of the power shaft 1. The larger portion surrounding the perforation in the dog is provided with a notch 25, to receive the pin 11 that projects laterally from the reduced end 10 of the power shaft. Near the inner end of the dog 15 is a leather ring or washer to provide a valve 26 held against a surface 27 bounding the orifice 28 thru which the dog 15 passes. The spring 20 yieldingly holds the valve 26 on its seat or in contact with the seat or surface 27 which bounds the orifice. The outer end of the dog 15 is perforated, as at 28 to receive the reduced end 30 of the starting crank 31. A pin 32 passes thru the reduced end of the starting crank and is received in a notch 33 of the dog 15. 34 is a bearing thru which the end of the starting crank 31 is passed and which supports the crank during the starting operation of the engine, effected by the instrumentality of the crank.

The operation of the device is easily understood. The crank 31 is placed in the orifice provided by the support 34 and is moved axially until the pin 32 enters the notch 33 of the dog 15, whereupon further inward movement of the crank and dog yieldingly opposed by the spring, will cause the notch 25 to encompass the opposite ends of the pin 11 that passes thru the reduced end 10 of the power shaft. When the parts are in place, as described, the crank 31 is rotated until the engine is started whereupon the withdrawal of the crank will result in the spring 20 pushing the dog into the position shown in the drawing, thereby seating the valve and sealing the orifice thru which the dog 15 passes so that oil that may be contained in the casing 13 can not leak thru the orifice within which the dog is enclosed.

While I have herein shown a single embodiment of my invention for the purpose of clear disclosure, it will be manifest to persons skilled in the art that changes may be made in the general arrangement and configuration of the parts within the scope of the appended claims.

Having described my invention, what I claim is:—

1. In a device of the character described the combination of a closed casing; a shaft therein, to be rotated, terminating near an outer wall of the casing, said outer wall having an opening in line with the shaft; a clutch member on the end of the shaft; an axially movable plug in said opening, coaxially arranged with the shaft; a clutch member on the end of the plug to rotatably engage the clutch member on the shaft when the plug is moved inwardly; a spring to yieldingly hold the plug in its outward position; a packing member movable with the plug and seated by the spring and means to rotate the plug.

2. In a device of the character described the combination of a closed casing; a shaft therein, to be rotated, terminating near an outer wall of the casing, said outer wall having an opening in line with the shaft; a hollow hub secured to said wall over the opening; a plug axially slidable within said hub and having a clutch member on each end thereof; a spring surrounding the hub and plug to yieldingly hold the plug in outward position and a packing ring movable with the plug to seal the opening by operation of the spring.

In testimony whereof I hereunto subscribed my name.

ADOLPH MONSEN.